No. 614,064. Patented Nov. 8, 1898.
C. S. SHARP.
CORN HARVESTER.
(Application filed Mar. 27, 1897.)
(No Model.) 4 Sheets—Sheet 1.

Witnesses:
Harry O. Robinson.
Arthur J. Randall.

Inventor:
Charles S. Sharp.
by B. J. Hayes
Attorney.

No. 614,064. Patented Nov. 8, 1898.
C. S. SHARP.
CORN HARVESTER.
(Application filed Mar. 27, 1897.)
(No Model.) 4 Sheets—Sheet 2.

Witnesses: Inventor:
Harry O. Robinson. Charles S. Sharp
Arthur L. Randall. by B. J. Hayes
Attorney.

No. 614,064.  
C. S. SHARP.  
CORN HARVESTER.  
(Application filed Mar. 27, 1897.)  
(No Model.)

Patented Nov. 8, 1898.

Witnesses:  
Harry O. Robinson.  
Arthur T. Randall.

Inventor:  
Charles S. Sharp  
by B. J. Hayes  
Attorney.

UNITED STATES PATENT OFFICE.

CHARLES S. SHARP, OF AUBURN, NEW YORK, ASSIGNOR TO THE D. M. OSBORNE & COMPANY, OF SAME PLACE.

CORN-HARVESTER.

SPECIFICATION forming part of Letters Patent No. 614,064, dated November 8, 1898.

Application filed March 27, 1897. Serial No. 629,465. (No model.)

*To all whom it may concern:*

Be it known that I, CHARLES S. SHARP, of Auburn, county of Cayuga, State of New York, have invented an Improvement in Corn-Harvesters, of which the following description, in connection with the accompanying drawings, is a specification, like letters and figures on the drawings representing like parts.

This invention relates to corn-harvesters of that class wherein the standing corn is cut and conveyed along the passage-way in standing position to a binder and bound "on end," such a corn-harvester being shown and described in United States Patent No. 539,830, granted to me May 28, 1895; and the invention has for its object to improve the construction of a corn-harvester such as therein shown in many particulars.

First. To so construct and arrange the corn-engaging chains that the laterally-projecting corn-engaging fingers thereof will recede from the corn in said passage-way substantially at right angles to said passage-way when disengaging the corn instead of receding therefrom in the arc of a circle, as heretofore, as when traveling concentrically to the axis of a sprocket-wheel or other chain-carrying wheel around which the corn-engaging chains pass. Corn-engaging fingers which thus recede from the corn at substantially right angles to the corn-passage when disengaging the corn in said passage do not act to push rearward the corn, nor does the corn act to retard or restrain the movement of the chains, and such receding fingers are especially desirable when the chains bearing them terminate at points intermediate the length of said passage.

Second. To provide at the rear part of the corn-passage long slack feeding-chains extending from a point in advance of the cutter rearwardly to the binder, such slack chains permitting any of the laterally-projecting fingers along its length to tip or turn backward in a direction toward the front of the machine sufficiently to slip by, over, or along the corn in said passage when the corn crowds instead of further crowding the corn, with a liability of choking up the passage either in front of the cutter, or thereabout, or in front of the binder, or, in fact, at any intermediate point.

Third. To provide a center feeding device about midway between the butt-feeding devices and the stalk-feeding devices, which works rearwardly along the corn-passage and assists in feeding along the corn, it being especially desired to assist in feeding along short corn, said center feeding device being preferably made as a plate having a toothed edge, which is adapted to act intermittingly upon the corn. This center feeding device or plate extends forward to a point considerably in advance of the cutter and rearward substantially as far as the butt-feeding devices, and it works at about the same speed as said butt-feeding devices.

Fourth. To provide said center feeding-plate with an extension at its rear end, which is preferably adjustably connected thereto.

Fifth. To provide the butt-feeding plates with extensions at their rear ends, preferably adjustably connected thereto.

Sixth. To provide a corn-harvester with a binder which is supported by the main frame at the rear end of the machine and which is adjustable in such a manner that it may be caused to occupy a vertical position or may be rearwardly inclined, and its rearward inclination may be varied at will.

Seventh. To provide an adjustable top-packer on the packer-shaft of the binding mechanism, working in combination with upwardly-inclined feeding devices the rear ends of which are adjustable to different elevations.

Figure 1 shows in plan view a corn-harvester having embodied therein the several improvements forming the subject-matter of this invention, the top board of one of the gathering-arms being removed to expose the parts beneath.

The gathering-arms consist, essentially, of the upwardly-inclined portions $a\,b$, located a short distance apart, and the lower horizontal portions $a'\,b'$, likewise located a short distance apart, all supported by the framework and adapted to form a more or less laterally-confined passage-way between them extending from the forward end of the machine rearwardly toward or to a binder B, and erected upon each upwardly-inclined portion $a\,b$ is a top board $a^{20}\,b^{20}$, said boards being set more or less obliquely to the portions $a\,b$, but arranged in opposite ways, to thereby form a flaring top to said laterally-confined passage-way.

The upwardly-inclined portions $a\,b$ and parts supported above and upon them diverge from each other toward the rear part of the machine, (see Fig. 1,) so that the passage-way is wider at the rear end than at the front end, such gradually-increasing width providing ample space for the severed stalks of corn in front of the binder to prevent crowding and to better enable the corn feeding and severing devices to perform their respective functions. A cutter $d^{16}$ of any usual construction is arranged to work across said passage-way substantially midway its length and quite near to the ground to sever the standing corn which is presented to it, and it will be seen that as the sides of the passage-way gradually diverge at the rear part thereof the passage-way will gradually increase in width between the cutter $d^{16}$ and the binder B.

There are two sets of corn-engaging devices shown in the present machine, which work along the laterally-confined corn-passage, and in many respects they are the same as shown in my United States Patent No. 601,760, dated April 5, 1898, they being represented as two pairs of corn-engaging chains $a^5\,a^5$ and $a^6\,a^6$, the former being arranged to work along the front part of the passage-way and the latter to work along the rear part of the passage-way, the former "righting" the leaning stalks of corn and the latter working in conjunction with other devices to present the "righted" corn to the cutter and to feed along the severed corn.

As herein shown, the corn-engaging chains $a^5\,a^5$ each pass around idle-wheels 2 2 2 and around large sprocket-wheels $a^{50}\,a^{50}$, which are secured to the upper ends of oblique driving-shafts $a^{51}$, said shafts being provided at their lower ends with bevel-gears $a^{52}$, engaging bevel-gears $a^{53}$, secured to the main driving-shaft of the machine, and, as herein shown, the corn-engaging chains $a^6\,a^6$ each pass around idle-wheels 3 3 3 and around wheels $a^{60}$, which are secured to the upper ends of said oblique driving-shafts $a^{51}$ just above the sprocket-wheels $a^{50}$, and as said oblique shafts $a^{51}$ are rotated in opposite ways said chains will be moved along with their adjacent engaging portions traveling in the same direction.

The driving sprocket-wheels $a^{50}$ are larger than the driving sprocket-wheels $a^{60}$, and as a consequence the chains $a^5\,a^5$ will be driven faster than the chains $a^6\,a^6$. The relative proportions of the parts is such that said chains $a^5\,a^5$ will be driven faster than the speed at which the machine advances, and the chains $a^6\,a^6$ will be driven at about the speed of the machine, and said foremost chains will operate to "right" the leaning stalks before they are presented to the cutter, and the rearmost chains will operate in conjunction with other devices to engage the stalks which have been brought into upright position by said chains $a^5\,a^5$ and will present them to the cutter and thereafter feed along the severed corn toward or to the binder.

Figures 1, 9:
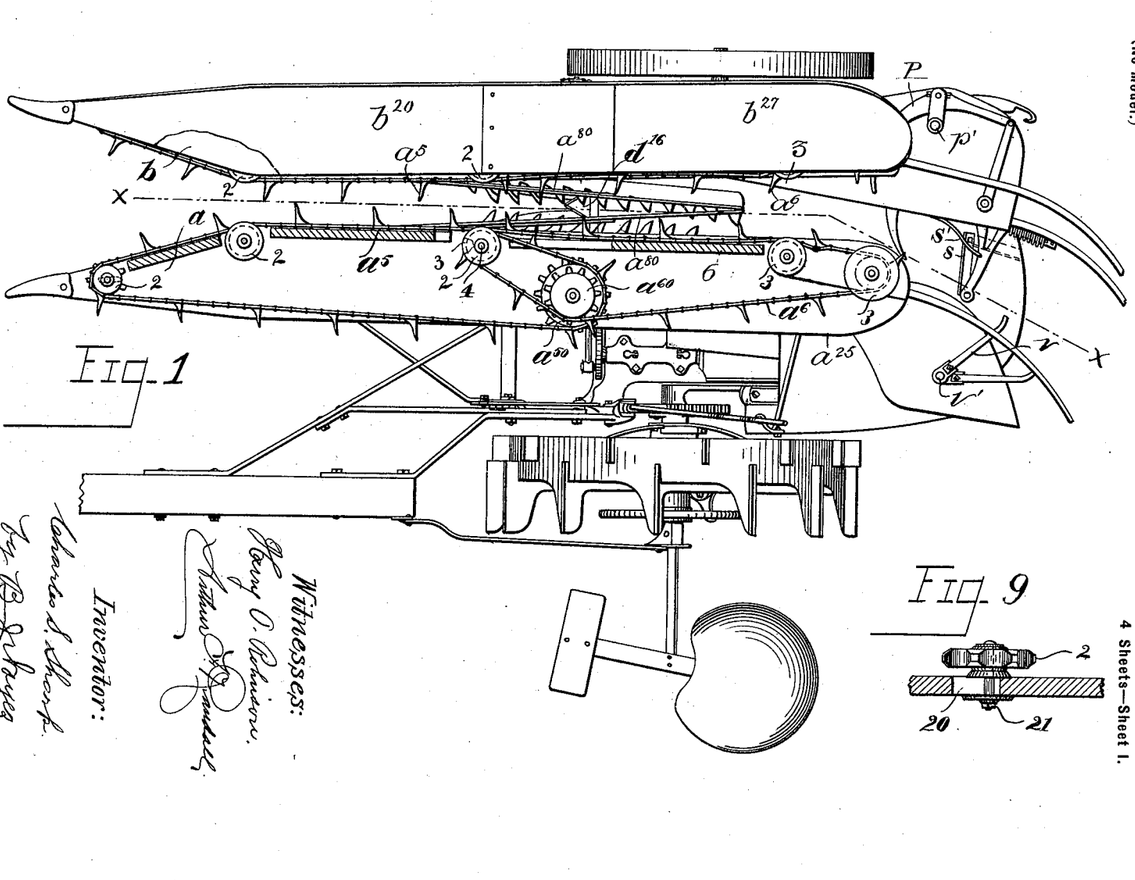

The rearmost idle-wheels 2, around which the forward chains $a^5$ pass, and the front idle-wheels 3, around which the rear chains $a^6$ pass, are preferably mounted upon the same studs, as 4, for simplicity, and said studs 4 are located quite a distance in front of the driving sprocket-wheels $a^{50}\,a^{60}$ instead of alongside of said sprocket-wheels, as best shown in Fig. 1, and by so locating the studs 4 the rear chains $a^6\,a^6$ will engage the corn quite a distance in front of the cutter $d^{16}$, which is important.

The studs 4 are located quite close by the passage-way and the driving sprocket-wheels $a^{50}\,a^{60}$ some distance therefrom, so that the chains $a^5\,a^5$ in passing from the wheels 2, which are mounted on said studs 4, to said driving sprocket-wheels $a^{50}$ will travel diagonally or obliquely to the passage-way, but in opposite ways. This diagonal movement or travel of the rear ends of the chains $a^5\,a^5$ is important, for it enables the corn-engaging fingers thereof to recede from the corn at substantially right angles to the passage-way as they travel along from the wheels 2 on studs 4 to the sprocket-wheels $a^{50}$, and, furthermore, to recede gradually or slowly; and by disengaging the corn in this manner they do not act upon the corn with a tendency to thrust it rearward, as they do when disengaging it by traveling in the arc of a circle—as, for instance, when traveling bodily around sprocket or chain-carrying wheels; nor does the corn act to retard or restrain the movement of the chains $a^5\,a^5$.

It will be seen that the diagonal travel or movement of the chains is at a point substantially midway the length of the corn-passage and just where the slowly-moving chains take the corn which is delivered to them by the rapidly-moving chains, and in practice it is important that the fingers should recede in this manner at this particular place.

At the rear ends of the rear chains $a^6 a^6$ the rearmost idle-wheels may also be so located with respect to the idle-wheels in front of them that a diagonal travel or movement in opposite ways from the passage-way will be obtained for said rear chains at this point.

The rear chains $a^6 a^6$ are made quite long—much longer than in my Patent No. 601,760—and are extended forward a considerable distance in front of a vertical line with the cutter $d^{16}$ to engage the corn which is delivered to them by the rapidly-moving corn righting and feeding devices, and said chains $a^6 a^6$ are so driven that their slack portions are adjacent the passage-way, and as a consequence the fingers thereof are free to turn in a direction toward the front of the machine, to slip by, over, or along the corn when the corn becomes crowded in the passage-way, and in order that said fingers may thus turn at any point along the passage-way from a point in front of the cutter to a point in front of the binder the upright boards 6, which are erected along the inner edges of the upwardly-inclined portions $a\,b$ between the wheels 3 3 at the front and rear ends of said rear chains, are located a short distance back of the peripheries of said wheels, to thereby provide ample space in which said slack chains may recede and the fingers thereof tip over.

Figures 3, 6, 7:
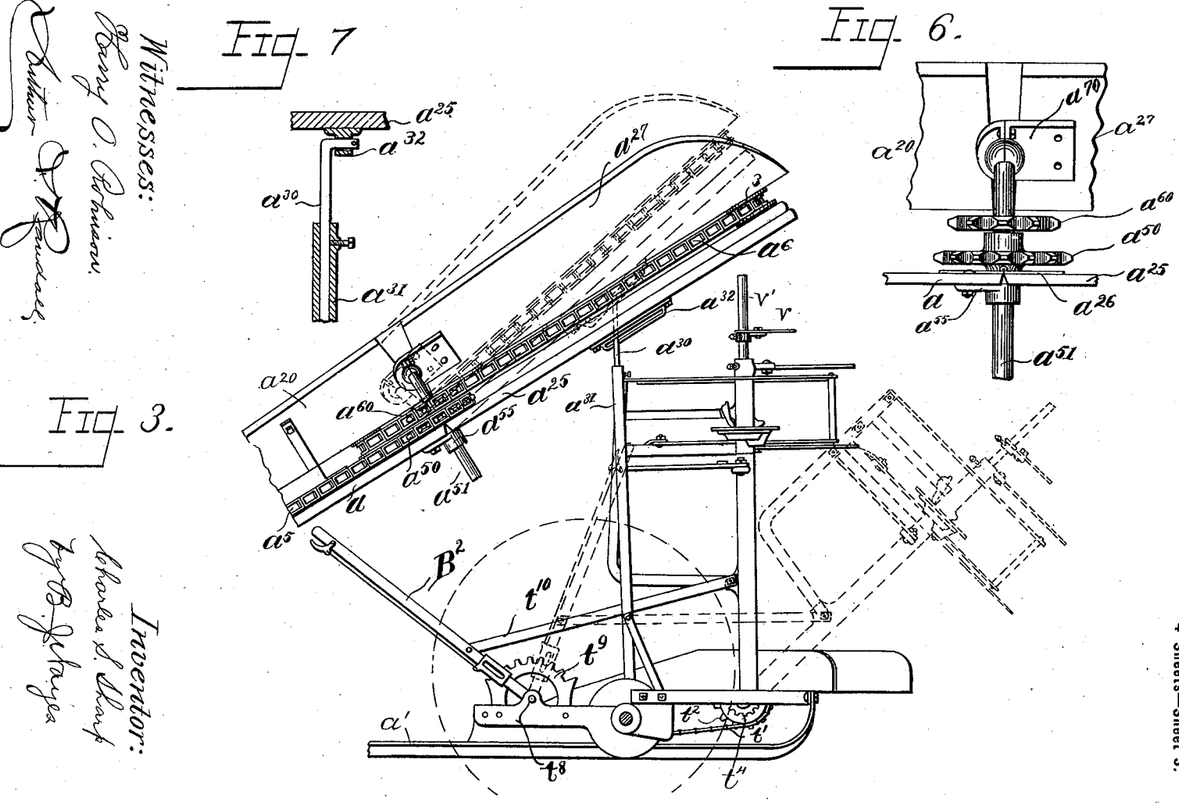
* Fig. 3, a detail showing in elevation the adjustable feeding devices working at the rear part of the corn-passage, and also showing the adjustable binder at the rear end of the machine.
Fig. 6 shows a detail of the adjustment of the corn-feeding device which works at the rear part of the corn-passage.
Fig. 7, a detail of the means employed for supporting the rear ends of the upper side walls of the corn-passage in different elevations.
Figure 4:
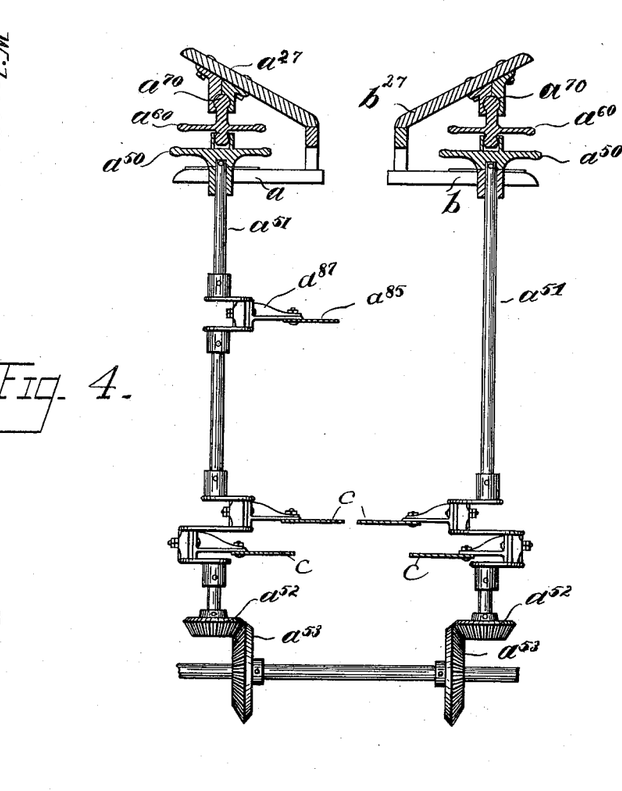
Fig. 4 is a detail showing an end view of the reciprocating corn-feeding devices and operating mechanism therefor.

The corn-engaging devices at the rear part of the corn-passage, which are herein represented as feeding-chains $a^6 a^6$, are made adjustable in such manner that their rear ends may be raised and lowered to accommodate short and tall corn, it being particularly desirable to raise the same for tall corn. In carrying out this part of my invention the upwardly-inclined portions $a\,b$ are divided transversely at points substantially midway their length—as, for instance, at points substantially opposite the oblique shafts $a^{51}$—and the rear parts $a^{25} b^{25}$ of such portions are hinged to the front parts at such point by hinges $a^{26}$, (see Fig. 6,) so that said rear parts $a^{25} b^{25}$ may be raised and lowered on their hinge connections. To move the feeding devices or chains $a^6 a^6$ with said parts $a^{25} b^{25}$, the driving sprocket-wheels $a^{60}$, with which said chains are connected, are in turn connected with the shafts $a^{51}$ above the driving sprocket-wheels $a^{50}$ by universal joints, as shown in Fig. 4, so that said sprocket-wheels $a^{60}$ may be tilted in different directions, and the upper bearings $a^{70}$ for said sprocket-wheels $a^{60}$ are secured to the under sides of the oblique top boards $a^{27} b^{27}$, so that as the rear parts or end portions are raised or lowered the sprocket-wheels $a^{60}$ will be correspondingly tilted and the chains $a^6 a^6$ maintained in parallelism with said adjustable rear parts. It is obvious that many ways may be devised for thus adjusting to different elevations the rear parts or ends of the side portions of the corn-passage and also for adjusting the rear corn engaging or feeding devices to different elevations without departing from the spirit and scope of this invention; and, furthermore, I desire it to be understood that I do not limit my invention to any particular location of the front ends of said adjustable portions.

The rear ends of the front parts $a\,b$ are stationarily supported upon projections $a^{55}$, formed on collars or hubs on said oblique shafts $a^{51}$. The rear ends of the rear parts $a^{25} b^{25}$ are supported upon vertically-adjustable rods or uprights $a^{30}$, telescopically mounted in and supported by the tubular rods $a^{31}$, rising from the frame, the upper ends of said rods $a^{30}$ being bent right-angularly or offset, as shown in Fig. 7, and passed through the slots of the slotted bearing-blocks $a^{32}$, which are secured to the under sides of the parts $a^{25} b^{25}$. As said rods $a^{30}$ are raised and lowered the upper ends thereof will slide along in the slots of said blocks $a^{32}$ and will raise and lower the parts $a^{25} b^{25}$ on their hinged connections, said parts being movable from the full-line to the dotted-line position shown in Fig. 3. The oblique top boards $a^{20} b^{20}$ are likewise divided transversely in two parts, and the rear parts thereof, as $a^{27} b^{27}$, are movable with the parts $a^{25} b^{25}$ upon said hinged connections $a^{26}$. The corn-engaging chains $a^5 a^5$, which work rearwardly along the front part of the passage-way formed by the gathering-arms, pass around sprocket or chain-carrying wheels 2, which are located at the forward ends of said arms, and herein said sprocket-wheels 2 at the forward ends of the arms are held in adjustable bearings. (See Figs. 1 and 9, wherein it will be seen that the upwardly-inclined portions $a\,b$ are slotted at 20 to receive and permit adjustment therein of the pins or studs 21, upon which said sprocket-wheels 2 are mounted.)

Figures 2, 8:
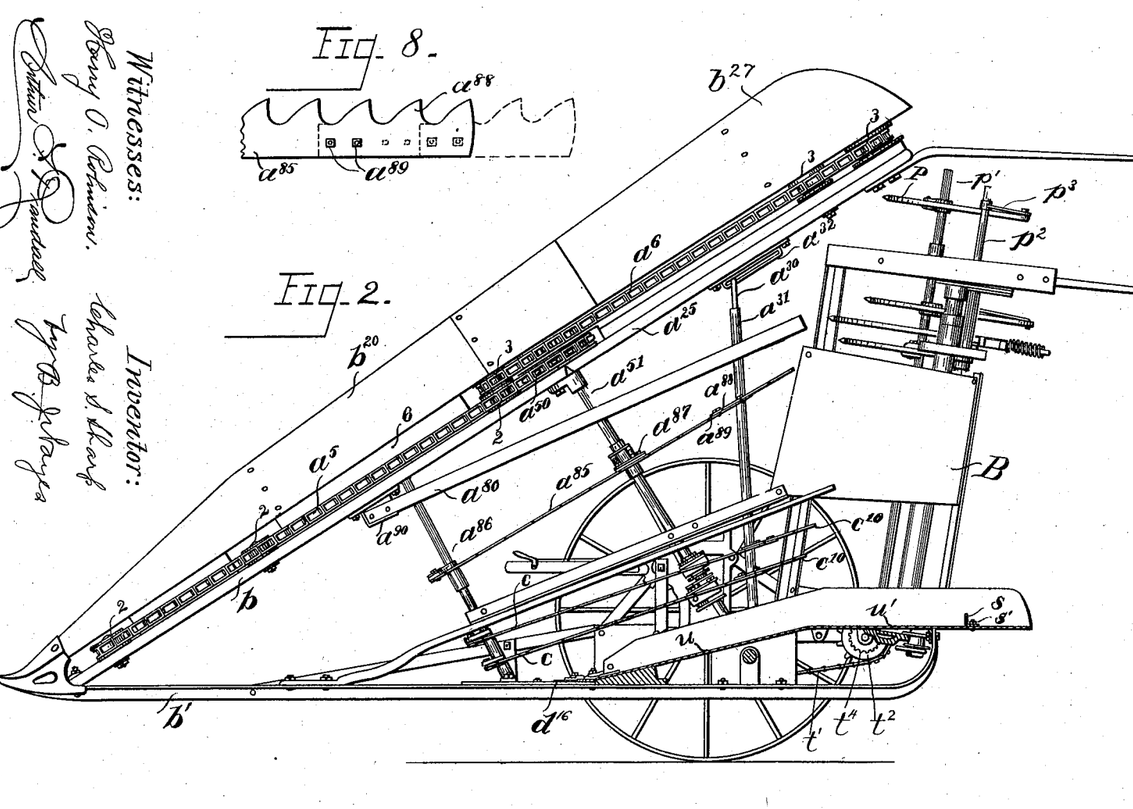
Fig. 2 is a vertical section of the machine shown in Fig. 1, taken on the dotted line *x x.
Fig. 8, a detail showing an extension on the rear end of one of the corn-engaging plates and means for adjustably attaching it to said plate, and Fig. 9 a detail showing the adjustable idle sprocket-wheel which is located at the forward end of each gathering-arm.

In some cases the corn to be gathered, cut, and bound is quite short, and oftentimes short stalks appear in with the tall stalks, and in order to adapt the machine for stalks of average height there is a wide space between the butt-feeding devices $c\,c$ and the upper or stalk-feeding devices $a^6 a^6$, and on account of the width of this space there is a liability of the short corn becoming disengaged by the upper feeding devices, and in such case, as they will be held only by the butt-feeding devices, they will fall to one side or the other of the passage-way and become entangled in the machine, and to engage the tops of such short corn, as well as for other purposes to be hereinafter referred to, arms $a^{80}$ are provided, there being two such arms attached one to the under side of each upwardly-inclined portion $a\,b$ and extended rearwardly toward the binder B, and while said arms $a^{80}$ serve to hold the tops of the corn in such a manner as to prevent such corn from falling to one side or the other they do not serve to feed the corn along, and hence I have herein provided a center feeding device, which is herein shown as a toothed plate $a^{85}$, (see Figs. 2 and 4,) located in parallelism with the corn-passage, it being attached loosely at its forward end to an arm $a^{86}$, loosely mounted upon one of the upright supports of the frame, and attached at its opposite end loosely to an arm $a^{87}$, projecting from a crank-arm on the oblique shaft $a^{51}$ substantially midway its length, and as said shaft $a^{51}$ turns said center feeding-plate $a^{85}$ will be moved into engagement with the corn in the corn-passage, then rearwardly along said corn-passage, and then out of engagement with the corn, and finally returning to its starting-point. The center feeding-plate $a^{85}$ thus has an intermittent action upon the corn in the corn-passage and will assist in feeding it along. I have herein shown this feeding-plate as located and adapted to work about midway between the lower or butt-feeding devices and the upper or stalk-feeding devices, and while it is especially employed for use in connection with short corn it will also assist in feeding along all corn in the corn-passage. But one feeding-plate $a^{85}$ is here shown, which works rearwardly along the corn-passage at one side of the corn; but it is obvious that a similar corn-engaging plate may be located at the opposite side of the corn-passage to act upon the corn in a similar manner and to be operated by the oblique shaft $a^{51}$ at that side of the corn-passage.

The center feeding-plate $a^{85}$ is made of suitable length and is disposed in such relation to the other parts that it works in advance of, across, and at the rear of the cutter $d^{16}$, and it is herein shown as adapted to move at substantially the same speed as the butt-feeding devices $c\,c$, which, it will be understood, is substantially the speed at which the machine advances. To thus move the center feeding-plate $a^{85}$ at the same speed as the butt-feeding devices $c\,c$, the crank-arms to which all of said parts are connected will be of the same length and will project from the shaft at the same angle. It is sometimes desirable to have the center feeding-plate $a^{85}$ work rearwardly toward the binder farther than at other times, and hence I have provided an extension $a^{88}$, (see Figs. 2 and 8,) which is adjustably attached to the rear end of said plate $a^{85}$. As herein shown, the extension $a^{88}$ is attached to the rear end of said plate $a^{85}$ by bolts $a^{89}$, which pass through holes in the plate. These extensions $a^{88}$ may be adjusted to lengthen or shorten the plates, and, if desired, may be omitted; also, as herein shown, extensions $c^{10}$ are adjustably attached to the rear ends of the butt-feeding plates $c\,c$, said extensions $c^{10}$ being constructed similar to the extensions $a^{88}$ and adjustably connected to the rear ends of the butt-feeding plates $c\,c$ in substantially the same way.

The pressure bars or plates $a^{80}$, which act upon the corn in the corn-passage below the upper or stalk-feeding devices, are attached at their forward ends to blocks $a^{90}$, secured to the under sides of the upwardly-inclined portions $a\,b$, and, as herein shown, the front ends of said bars are attached to said portions $a\,b$ a considerable distance in advance of the cutter $d^{16}$, so that said plates, which gradually converge at the center line of the corn-passage, may begin to act upon the corn before the corn is presented to the cutter $d^{16}$, and therefore the stalks of corn are separated more or less before being cut, which facilitates the cutting operation.

Figure 5:
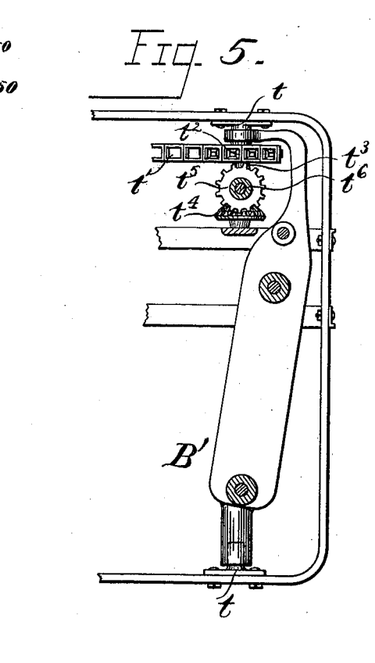
Fig. 5 shows a detail of the pivotal connections of the adjustable binder.

At the rear end of the machine the main framework is provided with pivot-studs $t$, (see Fig. 5,) there being one at each side of the main framework, and upon said studs a supporting-frame B' is journaled, which frame supports the binder B, and the actuating device for the binder mechanism consists of a chain $t'$, which is driven by a sprocket-wheel on the main driving-shaft and which passes over a sprocket-wheel $t^2$, secured to a short shaft $t^3$, having its bearings in the main framework. The shaft $t^3$ has secured to it a bevel-gear $t^4$, which engages a bevel-gear $t^5$, secured to the lower end of the vertical shaft $t^6$ of the binder mechanism. Thus the sprocket-wheel $t^2$ serves as the main driving-wheel of the binder-actuating mechanism, and its axis is coincident with the axis on which the supporting-frame B' moves. The binder, which is supported by the frame B', may be held in a vertical position, as shown in Fig. 3, or it may be inclined rearwardly to any degree from a perpendicular by turning the supporting-frame B' on the pivot-studs $t$, one rearwardly-inclined position of the binder being shown by dotted lines in Fig. 3, and as the driving-wheel $t^2$ of said binder mechanism turns on the axis on which the binder is adjusted said binder mechanism will be operatively connected with the main shaft in any of the different rearward inclinations of said binder. As a means of thus moving the binder to adjust it rearwardly to different inclinations I have herein shown a set-lever B², which is pivoted to the frame at $t^8$ and which carries a dog adapted to enter any of the notches formed in a toothed quadrant $t^9$, which is secured to the frame, and said set-lever B² is connected with said binder by a link $t^{10}$.

It will be seen that the binder B is supported and carried by the main frame, and as the front end of said frame rises or falls the binder at the rear end will be bodily moved, but in the opposite way—that is to say, as the front end of the machine falls the binder will be bodily raised—and, furthermore, it will be seen that in harvesting on a sidehill, as the front end of the machine will occupy different inclinations, it is important that the rearward inclination of the binder may be varied independently of the main framework which supports it and that such variations in its rearward inclination may be made easily and at any time during the progress of the machine.

As herein shown, the corn-passage from the cutter $d^{16}$ to the binder B has a floor $u$, which inclines upwardly from front to rear, and as the severed corn is conveyed along said passage the butts will rest upon said floor, and the binder has a horizontal floor $u'$, which is made as a continuation of said upwardly-inclined floor of the corn-passage, and while said floors are herein shown as stationarily supported by the main framework it is obvious that they may be adjustable to different elevations.

To assist in bundling and binding the corn, I have provided at the upper end of the packer-shaft of the binding mechanism a supplemental packer P, which is attached to a shaft $p'$, made telescopically adjustable in and out of the packer-shaft, which latter is made hollow to receive it, and a telescopically-adjustable rod $p^2$, having attached to it a link $p^3$, which is connected to said packer P, is likewise telescopically connected to one of the operating-shafts of the binder mechanism. Hence said supplemental packer P may be adjusted to different elevations, and in whatever elevation it may be set will be operatively connected with the binder mechanism.

The parts of the binder mechanism are so disposed with relation to the corn-feeding devices that the corn is fed into the path of movement or sweep of the packers.

On the floor or deck $u'$ of the binder a butt-detaining arm $s$ is adjustably secured—as, for instance, by a bolt $s'$, passing through the arm and through the floor of the binder—and it is against this arm that the butts of the corn will strike when being bound.

On the upper end of the knotter-shaft of the binder mechanism a retaining-arm $v$ is secured, (see Figs. 1 and 3,) which is preferably attached to a rod $v'$, telescopically connected to the upper end of said knotter-shaft, and said arm $v$ is therefore adjustable to different elevations, and said arm $v$ is secured to said rod $v'$ by a set-screw, so that it may be adjusted around said rod $v'$ to project radially therefrom in different directions, and said arm is especially desirable for use when binding tall corn, serving at such time as a detaining-arm for the bundle being bound, and said arm when swung more or less inward toward the center of the binder will assist in holding the corn in upright position while it is being bound.

I do not herein claim corn-engaging devices working rearwardly along the front part of the passage-way and upwardly-inclined corn-engaging devices working rearwardly along the rear part thereof and means for adjusting the rear ends of said rear corn-engaging devices to different elevations; nor do I herein claim a corn-harvester wherein the corn is gathered, cut, and conveyed rearwardly to an upright binder and bound on end, having a passage-way along which the corn is conveyed, a cutter working across the passage-way substantially midway its length, upwardly-inclined corn-engaging devices working along the front part of said passage-way and upwardly-inclined corn-engaging devices working rearwardly along the rear part of said passage-way, and means for adjusting the rear ends of said rear corn-engaging devices to different elevations relative to their front ends; nor do I herein claim a corn-harvesting machine having a pair of gathering arms or prongs located a short distance apart to provide a laterally-confined passage-way, said arms or prongs having top-guides which are jointed and the rear parts pivoted to the front, corn-engaging devices working rearwardly along the front part of said passage-way, upwardly-inclined corn-engaging devices working rearwardly along the rear part of said passage-way, and means for adjusting the rear ends of said rear corn-engaging devices and the rear ends of said top-guides to different elevations, as the same forms the subject-matter of and is claimed in my application Serial No. 677,002, filed April 9, 1898.

I claim—

1. In a corn-harvester, a passage-way, a cutter traveling across it substantially midway its length, a corn-engaging chain working rearwardly along said passage-way from the front end thereof to a point in proximity to the cutter and then passing around wheels disposed at different distances from said passage-way and one at the rear of the other, whereby the rear end of the chain travels diagonally to the passage-way and its fingers thereby caused to slowly recede from the corn at substantially right angles to the passage-way at a point substantially opposite the cutter, and another corn-engaging chain working rearwardly along said passage-way from the point where the front corn-engaging chain begins to move diagonally to the passage-way, substantially as described.

2. In a corn-harvester, a passage-way, a cutter traveling across it substantially midway its length, two sets of corn-engaging devices working rearwardly along said passage-way, one in front of the other, each set consisting of corn-engaging chains which work rearwardly along the passage-way and then diagonally away from said passage-way but in opposite ways, thereby causing the fingers to slowly disengage the corn by receding therefrom at substantially right angles to the passage-way, the front end of the rear set of corn-engaging devices being located at points where the front corn-engaging devices begin to move diagonally to the passage-way, substantially as described.

3. In a corn-harvester, a passage-way, a cutter traveling across it substantially midway its length, a set of rapidly-moving corn-righting devices working along said passage-way from the front end thereof to a point in front of the cutter, and a set of slowly-moving corn-engaging devices working rearwardly along said passage-way from a point in front of the cutter to or toward a binder, said corn-righting devices consisting of chains, the rear ends of which pass around wheels disposed one at the rear of the other and at different distances from the passage-way, whereby the rear ends of the chains move diagonally from said passage-way in opposite ways, causing the fingers to slowly disengage the corn by receding therefrom at substantially right angles to the passage-way, substantially as described.

4. In a corn-harvester, a passage-way, a corn-engaging chain working rearwardly along said passage-way having a slack corn-engaging portion, a pair of wheels over which said chain passes which are disposed to support said chain with its slack engaging portion in position to engage the corn in the passage-way, and a board as 6, located between said wheels, which is removed from the passage-way, against which said slack corn-engaging portion of the chain bears, substantially as described.

5. In a corn-harvester, a passage-way, a corn-engaging chain working rearwardly along said passage-way having a slack engaging portion, a pair of wheels as 3 3, over which said chain passes which are arranged to support said chain with its slack engaging portion in position to engage the corn in the passage-way, a board as 6, located between said wheels 3 3, but removed from the passage-way, and a wheel over which said chain passes, which is located at the rear of the rearmost wheel of said pair, but removed from the passage-way, substantially as described.

6. In a corn-harvester, a passage-way, a corn-engaging chain working rearwardly along said passage-way having a slack corn-engaging portion, the rear end of said chain passing around wheels disposed at different distances from said passage-way, and one at the rear of the other, whereby the rear end of said chain travels diagonally to the passage-way, substantially as described.

7. In a corn-harvester, a passage-way, a cutter, upper and lower upwardly-inclined corn-feeding devices, a pair of upwardly-inclined pressure-bars $a^{80}$, located between said upper and lower corn-feeding devices, which receive between them the corn which is conveyed along said passage-way, and an upwardly-inclined center feeding device which acts upon the corn close to said pressure-bars $a^{80}$, substantially as described.

8. In a corn-harvester, a passage-way, a cutter, upper and lower upwardly-inclined corn-feeding devices, means for engaging the tops of short corn as it passes out of engagement with the upper upwardly-inclined feeding devices, and an upwardly-inclined center feeding device located between said upper and lower corn-feeding devices and close to said means, which acts upon the corn to feed it along the passage-way, substantially as described.

9. In a corn-harvester, a passage-way, a cutter, upper and lower upwardly-inclined corn-feeding devices, means for engaging the tops of short corn as it passes out of engagement with said upper upwardly-inclined feeding devices, and an upwardly-inclined reciprocating corn-engaging plate $a^{85}$, located between said upper and lower corn-feeding devices and close to said means, which acts upon the corn to feed it along the passage-way, substantially as described.

10. In a corn-harvester, reciprocating toothed corn-engaging plates having adjustable extensions at their ends, substantially as described.

11. In a corn-harvester, a passage-way, a cutter, upwardly-inclined corn-righting devices working in front of the cutter, upper and lower upwardly-inclined corn-feeding devices which engage the corn just in front of the cutter and operate to present the corn to the cutter and then to feed the severed stalks rearward, and an upwardly-inclined toothed feeding-plate centrally located between said upper and lower feeding devices, and means for moving it to engage the corn in front of the cutter and assist in presenting it to the cutter and also assist in feeding the severed stalks rearward, substantially as described.

12. In a corn-harvester, means for gathering and cutting the corn, a passage-way along which it is fed, an upright binder supported by the main frame at the delivery end of said passage-way, and means for adjusting said binder from a vertical to a more or less rearwardly-inclined position, substantially as described.

13. In a corn-harvester, means for gathering and cutting the corn, a pivoted binder supported by the main frame of the machine and located at the rear end thereof, and means for adjusting said binder on its pivotal connections from a vertical to a more or less rearwardly-inclined position, substantially as described.

14. In a corn-harvester, means for gathering and cutting the corn, a passage-way having an upwardly-inclined floor along which the corn is fed, an upright binder pivotally supported by the main frame of the machine at the delivery end of said passage-way, and an adjusting device for adjusting said binder on its pivotal connections to different rearward inclinations, substantially as described.

15. In a corn-harvester, wherein standing corn is gathered, cut, and bound on end, a pivoted binder at the rear end of the machine and means for adjusting it on its pivotal connections to different rearward inclinations independent of the other parts of the machine, substantially as described.

16. In a corn-harvester, wherein standing corn is gathered, cut and bound on end, a pivoted binder at the rear of the machine, and means for adjusting it on its pivotal connections to different rearward inclinations, a driving-wheel for the binder-actuating mechanism turning on an axis coincident with the axis on which the binder is pivoted, said driving-wheel being operatively connected with the main driving-shaft of the machine, substantially as described.

17. In a corn-harvester, a passage-way, a cutter, upper and lower upwardly-inclined feeding devices for feeding the corn along said passage-way, means for adjusting the rear end of said upper feeding devices to different elevations relatively to their forward ends, an upright binder at the delivery end of said passage-way having a supplemental packer at the upper end of the packer-shaft adjustable to different elevations, substantially as described.

In testimony whereof I have signed my name to this specification in the presence of two subscribing witnesses.

CHARLES S. SHARP.

Witnesses:
RAYMOND M. ATHERLY,
FREDERICK M. EVERITT.